(12) United States Patent
Ozaki

(10) Patent No.: US 7,928,308 B2
(45) Date of Patent: Apr. 19, 2011

(54) DATA REPRODUCING APPARATUS AND DATA REPRODUCING METHOD

(75) Inventor: Eriko Ozaki, Hachioji (JP)

(73) Assignee: Canon Kabushiki Kaisha, Tokyo (JP)

( * ) Notice: Subject to any disclaimer, the term of this patent is extended or adjusted under 35 U.S.C. 154(b) by 924 days.

(21) Appl. No.: 11/754,547

(22) Filed: May 29, 2007

(65) Prior Publication Data

US 2008/0004731 A1    Jan. 3, 2008

(30) Foreign Application Priority Data

Jun. 30, 2006    (JP) ................... 2006-182012

(51) Int. Cl.
*G10H 1/00*    (2006.01)
*G10H 1/18*    (2006.01)
*G10H 7/00*    (2006.01)

(52) U.S. Cl. ............................. 84/615; 700/94

(58) Field of Classification Search ............ 84/615; 700/94; 352/12; 345/473
See application file for complete search history.

(56) References Cited

U.S. PATENT DOCUMENTS

| | | | |
|---|---|---|---|
| 6,396,500 B1 * | 5/2002 | Qureshi et al. | 345/473 |
| 7,051,291 B2 * | 5/2006 | Sciammarella et al. | 715/838 |
| 7,236,226 B2 * | 6/2007 | Hung et al. | 352/12 |
| 7,436,408 B2 * | 10/2008 | Hayashi et al. | 345/473 |
| 7,505,051 B2 * | 3/2009 | Wang | 345/660 |
| 7,669,132 B2 * | 2/2010 | Widdowson | 715/732 |
| 2004/0122539 A1 * | 6/2004 | Ainsworth | 700/94 |
| 2005/0275805 A1 * | 12/2005 | Lin et al. | 352/12 |
| 2008/0309795 A1 | 12/2008 | Mitsuhashi et al. | |

FOREIGN PATENT DOCUMENTS

| | | |
|---|---|---|
| JP | 2004-104674 A | 4/2004 |
| JP | 2004-206711 A | 7/2004 |
| JP | 2004-334964 A | 11/2004 |
| JP | 2005-057436 A | 3/2005 |
| JP | 2006-140559 A | 6/2006 |
| JP | 2006-173984 A | 6/2006 |

* cited by examiner

*Primary Examiner* — Jeffrey Donels (74) *Attorney, Agent, or Firm* — Canon U.S.A., Inc. I.P. Division (57) ABSTRACT

A data reproducing apparatus includes a music data reproduction list creating unit that obtains music data matching a time attribute of selected image data from a reproduction history storage unit in which a reproduction history about music data is stored and thus creates a reproduction list of music data. The data reproducing apparatus simultaneously reproduces music data and image data organized by a data organizing unit configured to match selected image data to the reproduction list.

10 Claims, 10 Drawing Sheets

DATA REPRODUCING APPARATUS AND DATA REPRODUCING METHOD

BACKGROUND OF THE INVENTION

1. Field of the Invention

The present invention relates to a data reproducing apparatus and data reproducing method for reproducing image data and music data together.

2. Description of the Related Art

There has been used a slideshow which displays, at predetermined time intervals, a series of image data items selected in advance by the user on a personal computer (PC) or the like. Recently, a variety of peripheral devices are connected via a network. Therefore, image data items and music data items that can be used for such a slideshow are not necessarily stored in one place and are often scattered in many places. Since this increases the workload involved in creating a slideshow, various techniques for creating a slideshow are developed and widely used.

For example, Japanese Patent Laid-Open No. 2005-057436 proposes a technique for reliably reproducing numbered image data and audio data associated therewith on television.

Also, Japanese Patent Laid-Open No. 2004-206711 discloses a technique for automatically analyzing music data to be reproduced together with selected image data or automatically analyzing image data to be reproduced together with selected music data to provide a slideshow that matches the user's preferences.

The reproduction time of image data often differs from that of music data due to a difference in the amount of data therebetween. As a solution to this, Japanese Patent Laid-Open No. 2004-334964 proposes a technique for reproducing selected music data over and over again during reproduction of image data.

With the conventional techniques described above, music data that matches the user's memories about image data cannot be automatically associated with the image data. Also, if the reproduction time of image data differs from that of music data, it is not possible to make an appropriate adjustment.

SUMMARY OF THE INVENTION

The present invention addresses the problems of the conventional techniques described above and provides techniques for automatically organizing music data that matches image data and making an appropriate adjustment if the reproduction time of image data differs from that of music data.

The present invention also provides a method for associating music data with image data, the music data being effective in reminding the user of the time when the image data was created.

According to an aspect of the present invention, a data reproducing apparatus for reproducing data recorded in a recording medium includes an organization parameter determining unit configured to determine an organization parameter for matching a reproduction list of music data and a reproduction list of image data, a data organizing unit configured to organize the music data and image data according to the organization parameter determined by the organization parameter determining unit, and a reproducing unit configured to simultaneously reproduce the music data and image data organized by the data organizing unit.

According to another aspect of the present invention, a data reproducing method for reproducing data recorded in a recording medium includes determining an organization parameter for matching a reproduction list of music data and a reproduction list of image data, organizing the music data and image data according to the determined organization parameter, and simultaneously reproducing the organized music data and image data.

With the present invention, it is possible to automatically organize music data that matches image data and make an appropriate adjustment if there is a difference between the reproduction time of image data and that of music data. Also, it is possible to associate music data with image data, the music data being effective, as background music (BGM) to be played during reproduction of image data, thus reminding the user of the time when the image data was created.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Exemplary embodiments of the present invention will now be described in detail in accordance with the accompanying drawings.

These embodiments are not intended to limit the present invention set forth in the appended claims, and not all combinations of features described in the embodiments are essential to the solving means of the invention.

Figure 1:
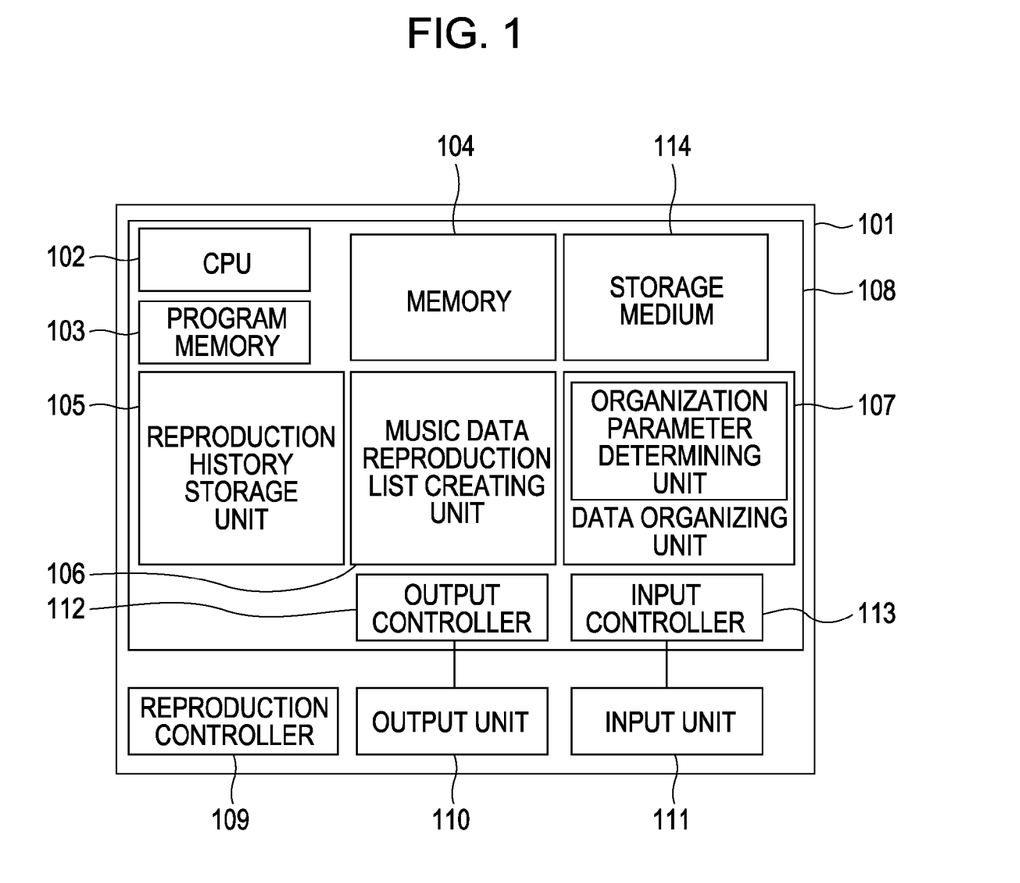
FIG. 1 is a block diagram illustrating a functional configuration of a data reproducing apparatus.

FIG. 1 is a block diagram illustrating a functional configuration of a data reproducing apparatus according to an exemplary embodiment of the present invention. A data reproducing apparatus 101 of FIG. 1 causes a reproduction controller 109 to reproduce image data and music data and outputs images and music to an output unit 110. The reproduction is controlled according to an instruction input by the user through an input unit 111. The output unit 110 includes a display device (e.g., cathode-ray tube (CRT) display, liquid crystal display, plasma display, or surface-conduction electron-emitter display (SED)) and an output device (e.g., speaker) for outputting music. An output controller 112 controls output operation, while an input controller 113 controls input operation.

An information processor 108 of the data reproducing apparatus 101 stores, in a storage medium 114, a processing program for realizing a reproduction history storage unit 105, a music data reproduction list creating unit 106, a data organizing unit 107, the reproduction controller 109, the input controller 113, and the output controller 112. The data organizing unit 107 includes an organization parameter determining unit for matching image data to music data.

Also, the information processor 108 implements the functions of the reproduction history storage unit 105, music data reproduction list creating unit 106, data organizing unit 107, reproduction controller 109, input controller 113, and output controller 112 according to the processing program stored therein. At the same time, the information processor 108 controls the input unit 111 and the output unit 110. Specifically, the information processor 108 includes a central processing unit (CPU) 102 and a program memory 103 which stores a processing program to be executed by the CPU 102.

The information processor 108 may further include a memory 104 which provides a work area for the CPU 102 to perform processing and temporarily stores various types of data. The functions of the reproduction history storage unit 105, music data reproduction list creating unit 106, data organizing unit 107, output controller 112, and input controller 113 are implemented by cooperation of the above-described processing program and the CPU 102.

The information processor 108 may further include a hard disk (HD) in which the processing program is installed. In this case, the processing program is loaded from the HD into a random access memory (RAM) and executed.

First Exemplary Embodiment

A first exemplary embodiment of the present invention will now be specifically described.

Figure 2:
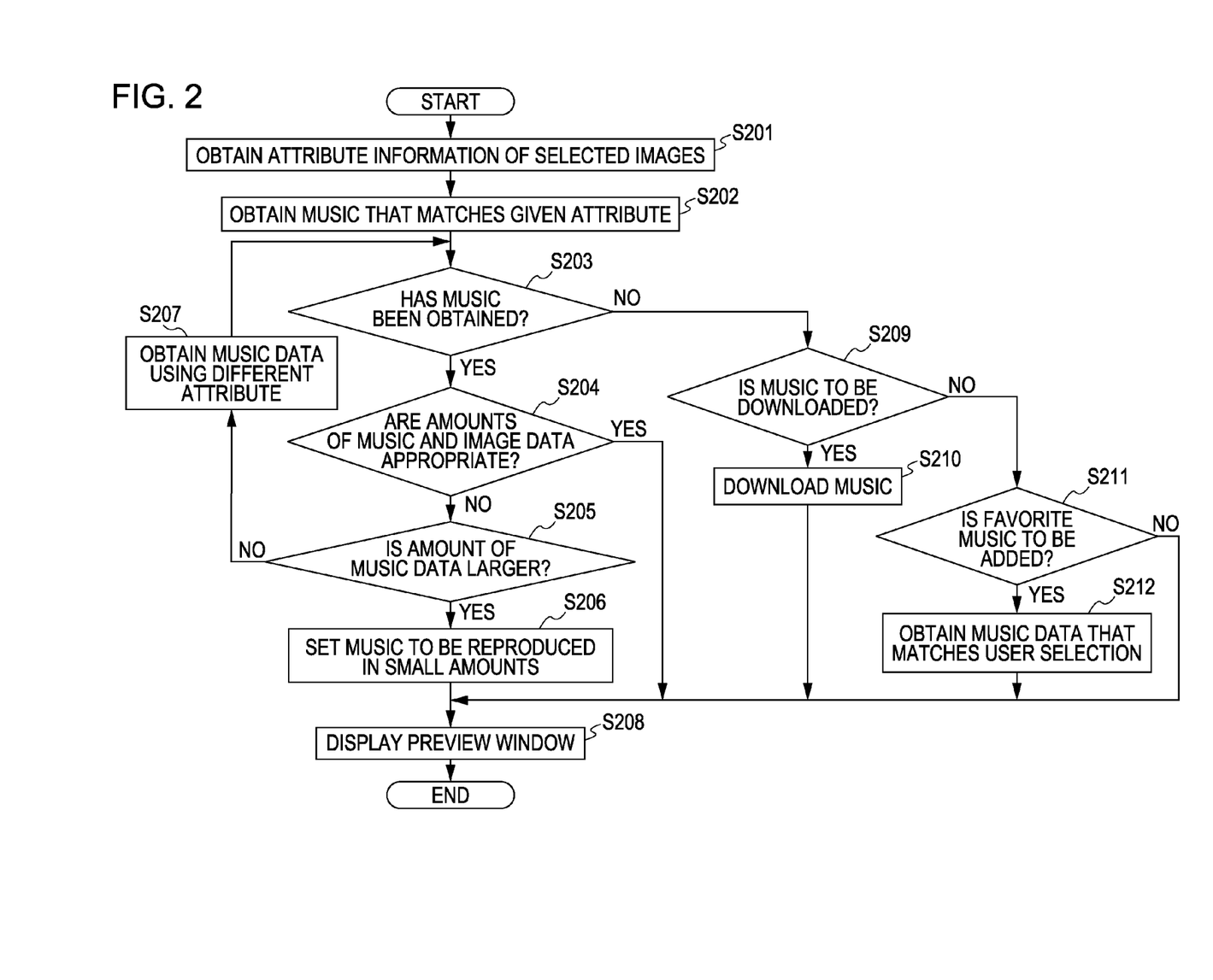
FIG. 2 is a flowchart illustrating an exemplary operation performed in a data reproducing apparatus for setting music data to be reproduced simultaneously with image data.

FIG. 2 is a flowchart illustrating an exemplary operation performed in the data reproducing apparatus 101 of the first exemplary embodiment for setting music data to be reproduced simultaneously with image data.

A program for executing this processing is stored in the program memory 103 of the information processor 108 and executed under the control of the CPU 102. This setting of music data is performed, for example, when a plurality of images are selected or when a reproduction list of a plurality of images is created.

First, in step S201, attributes of images selected by the user are obtained. Next, in step S202, the music data reproduction list creating unit 106 obtains music data corresponding to a given attribute obtained in step S201. Music data does not necessarily need to be stored in a storage medium 114 in the data reproducing apparatus 101. That is, the storage medium 114 may be a storage medium removable from the data reproducing apparatus 101. Music data may be stored in a device connected to the data reproducing apparatus 101 via a network or may be downloaded from the network. In other words, music data may be stored in any place and in any format as long as it can be reproduced by the reproduction controller 109.

In step S202, by using a time attribute, it is possible to obtain past hit tunes, such as best-selling songs at some point in the past, or tunes released during a certain period of time in the past.

In step S203, it is checked whether music has been successfully obtained. If music has been obtained (YES in step S203), the process proceeds to step S204. In step S204, the amount of obtained music data is compared with that of selected image data so as to determine whether the amounts of the music data and image data are appropriate for simultaneous reproduction. If the amounts of the music data and image data are appropriate (YES in step S204), the process proceeds to step S208, where a preview window is displayed. Then, the process ends.

On the other hand, if it is determined that the amounts of the music data and image data are not appropriate (NO in step S204), the process proceeds to step S205, where it is determined whether the amount of the music data is larger than that of the image data. If the amount of the music data is larger than that of the image data (YES in step S205), the process proceeds to step S206, where each of a plurality of pieces of music is set to be reproduced in small amounts. Then, the process proceeds to step S208, where a preview window is displayed. The process thus ends.

If the amount of the music data is smaller than that of the image data (NO in step S205), the process proceeds to step S207, where music is obtained using a different attribute. For example, if the user initially attempted to obtain music data that matches a creation time attribute of image data, the attribute to be matched is changed to a save time attribute, creator attribute, camera model attribute, or the like.

After music data that matches the different attribute is obtained, the process returns to step S203, from which the subsequent steps described above are performed.

If it is determined that music has not been successfully obtained (NO in step S203), the process proceeds to step S209, where the user is asked whether to download music. If the user wishes to download music (YES in step S209), the process proceeds to step S210, where music that matches the time attribute of the image data is downloaded from the network or the like.

If the user does not wish to download music (NO in step S209), the process proceeds to step S211, where the user is asked whether to set favorite music to be reproduced. If the user does not wish to set favorite music to be reproduced (NO in step S211), the process proceeds to step S208 where a preview window is displayed. Then, the process ends. If the user wishes to set favorite music to be reproduced (YES in step S211), the process proceeds to step S212, where the user's favorite music is set. The process then proceeds to step S208 where a preview window is displayed. Then, the process ends.

After the processing in FIG. 2 is completed, the music data reproduction list creating unit 106 creates a reproduction list of music data that match image data. When the start of reproduction is instructed through the input unit 111, the reproduction controller 109 starts reproducing the image data and music data.

Figure 12:
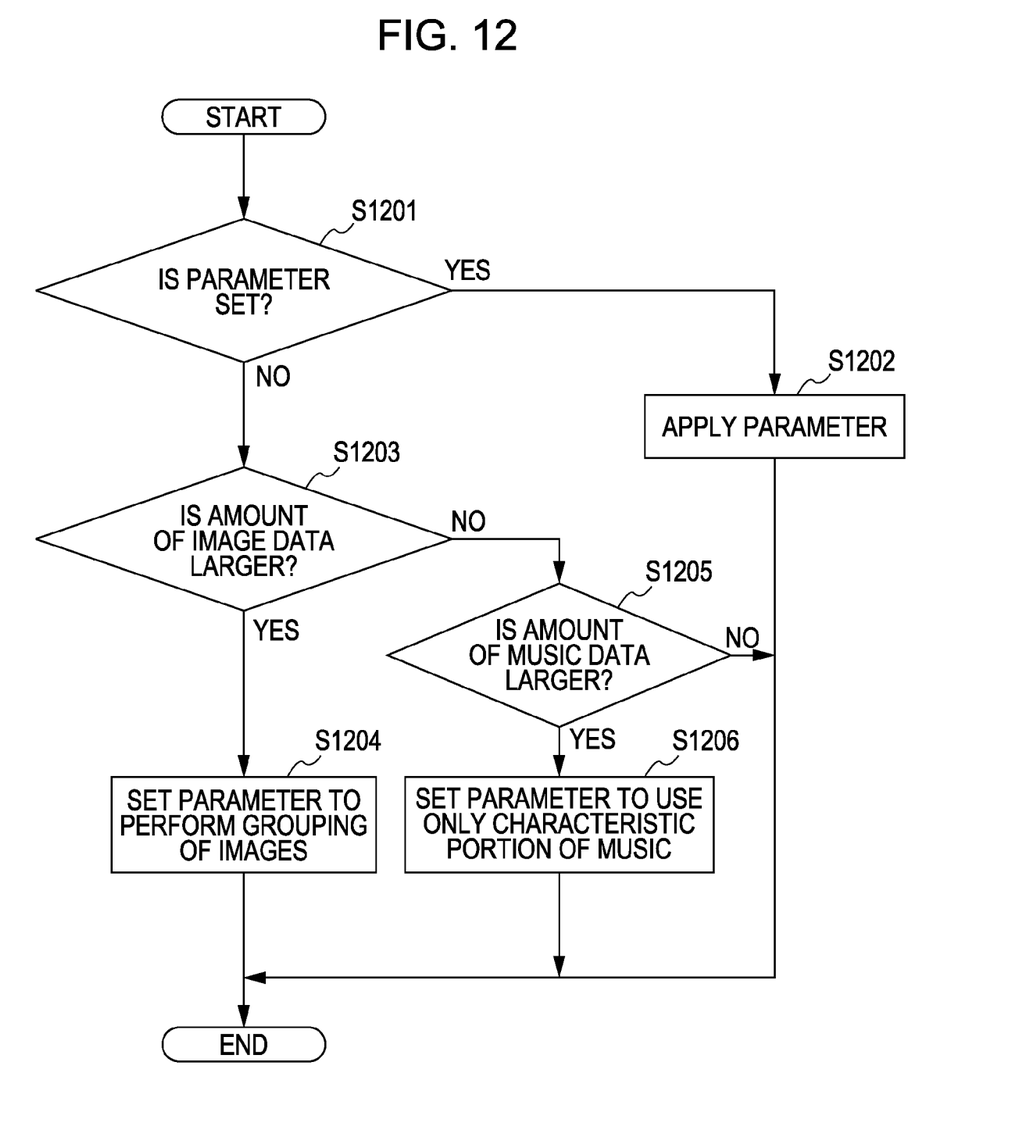
FIG. 12 is a flowchart illustrating an exemplary operation for determining an organization parameter in the data reproducing apparatus.

FIG. 12 is a flowchart illustrating an exemplary operation for determining an organization parameter.

First, in step S1201, it is checked whether an organization parameter is set. If an organization parameter is set (YES in step S1201), the process proceeds to step S1202, where the set organization parameter is applied. Then, the process ends. If an organization parameter is not set (NO in step S1201), the process proceeds to step S1203, where it is checked whether the amount of image data is larger than that of music data.

If the amount of image data is larger (YES in step S1203), the process proceeds to step S1204, where a parameter is set such that grouping of images is performed. The process then ends. On the other hand, if the amount of image data is not larger than that of music data (NO in step S1203), the process proceeds to step S1205, where it is checked whether the amount of music data is larger than that of music data.

If the amount of music data is not larger (NO in step S1205), the process ends. If the amount of music data is larger (YES in step S1205), the process proceeds to step S1206, where a parameter is set such that, for example, only a characteristic portion or a bridge portion of music is used. Thus, the reproduction time of music data is reduced to match the reproduction time of image data. The process then ends.

In the example described above, the amount of music data is compared with that of image data to set an organization parameter appropriate for simultaneous reproduction. Alternatively, the user may select an organization parameter. In this case, it is checked in step S1201 whether there is an organization parameter set by the user. At the same time, it is determined which of automatic setting and manual (or user) setting is to be given priority.

Figure 4:
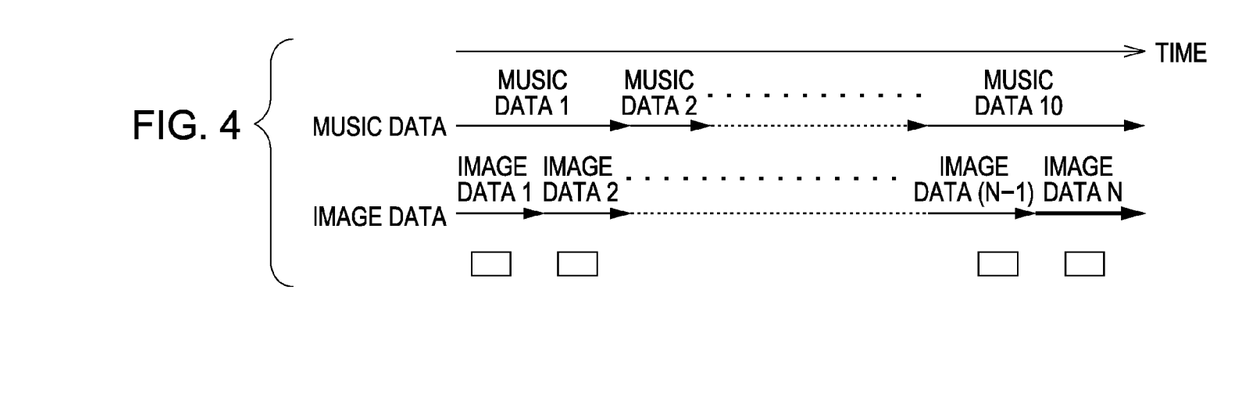
FIG. 4 is a conceptual diagram illustrating an exemplary data organizing method in which, in the data reproducing apparatus, music data related to image data is arranged.

FIG. 4 is a conceptual diagram illustrating an exemplary method in which, in the data reproducing apparatus 101 of the present exemplary embodiment, music data related to image data output to the output unit 110 is arranged.

For example, if N images are selected, the reproduction time of the image data is divided into N periods equally with respect to the reproduction time of obtained music data.

The data organizing unit 107 compares the reproduction time of music data with that of image data in advance. Then, the organization parameter determining unit determines how to match them.

However, the amounts of image data and music data are not always appropriate for simultaneous reproduction. An organization parameter may be set such that only half the obtained music data is used. For example, music data with specific file names or most frequently reproduced music data only may be used to match image data. Only portions of the obtained music data may be extracted and used on a time basis, or only characteristic portions of the obtained music data may be extracted and used.

In the above example, an organization parameter for determining how music data is to be adjusted to match the image data is automatically determined by the organization parameter determining unit. However, the organization parameter may be selected by the user through the input unit 111.

According to the first exemplary embodiment described above, music data that matches the time attribute of image data selected by the user can be set. It is thus possible to provide a data reproducing apparatus that enables the user to enjoy a slideshow without much trouble.

Second Exemplary Embodiment

A second exemplary embodiment of the present invention will now be described in detail with reference to drawings. A configuration of a data reproducing apparatus 101 of the second exemplary embodiment is similar to that of the first exemplary embodiment and thus will not be described here.

Figure 5:
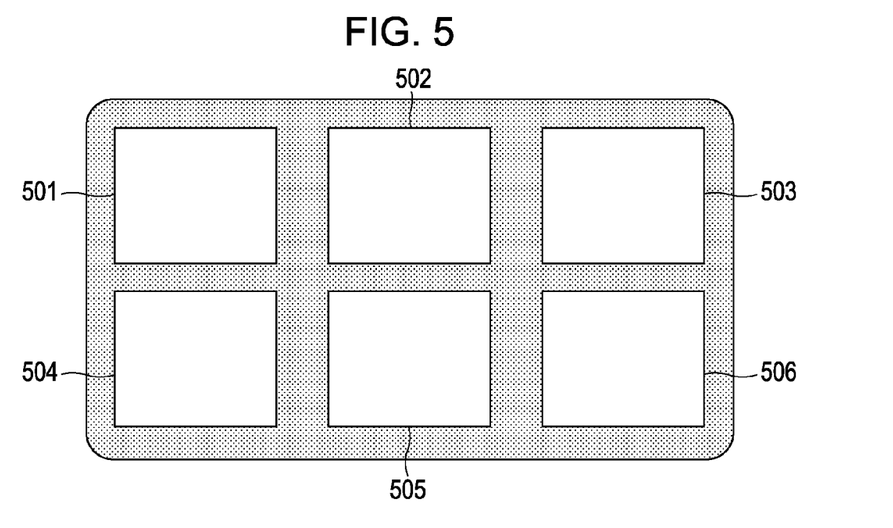
FIG. 5 illustrates an exemplary arrangement of images displayed on a screen of a data reproducing apparatus.

FIG. 5 illustrates an exemplary arrangement of images displayed on a screen of an output unit 110 in the data reproducing apparatus 101 of the present exemplary embodiment. Referring to FIG. 5, six image data items stored in a storage medium 114 or the like are displayed as reproduced images 501 to 506 for each drawing operation.

Each image data item may be displayed in the size in which it is stored. However, if, for example, a data organizing unit 107 determines that the amount of image data is extremely larger than that of music data, a plurality of image data items are displayed together as illustrated in FIG. 5. This prevents a deficiency of music data and an excess of image data.

The number and arrangement of reproduced images may be varied in individual cases. For example, two images may be arranged in a manner illustrated in FIG. 6.

Figure 6:
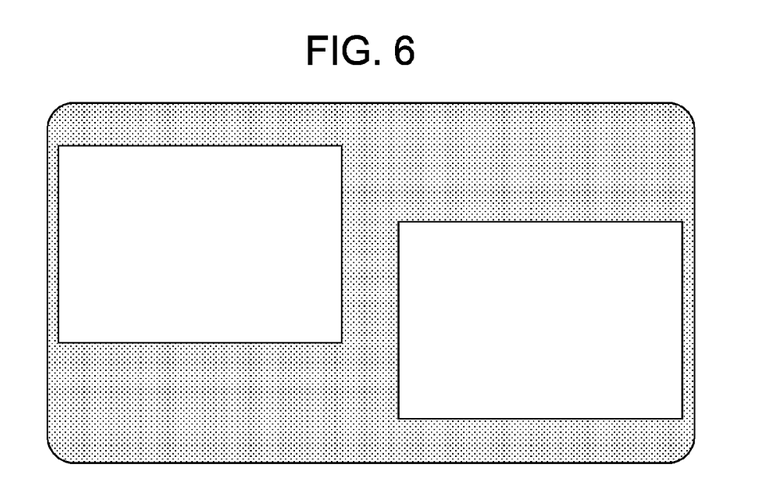
FIG. 6 illustrates another exemplary arrangement of images displayed on the screen of the data reproducing apparatus.
Figure 7:
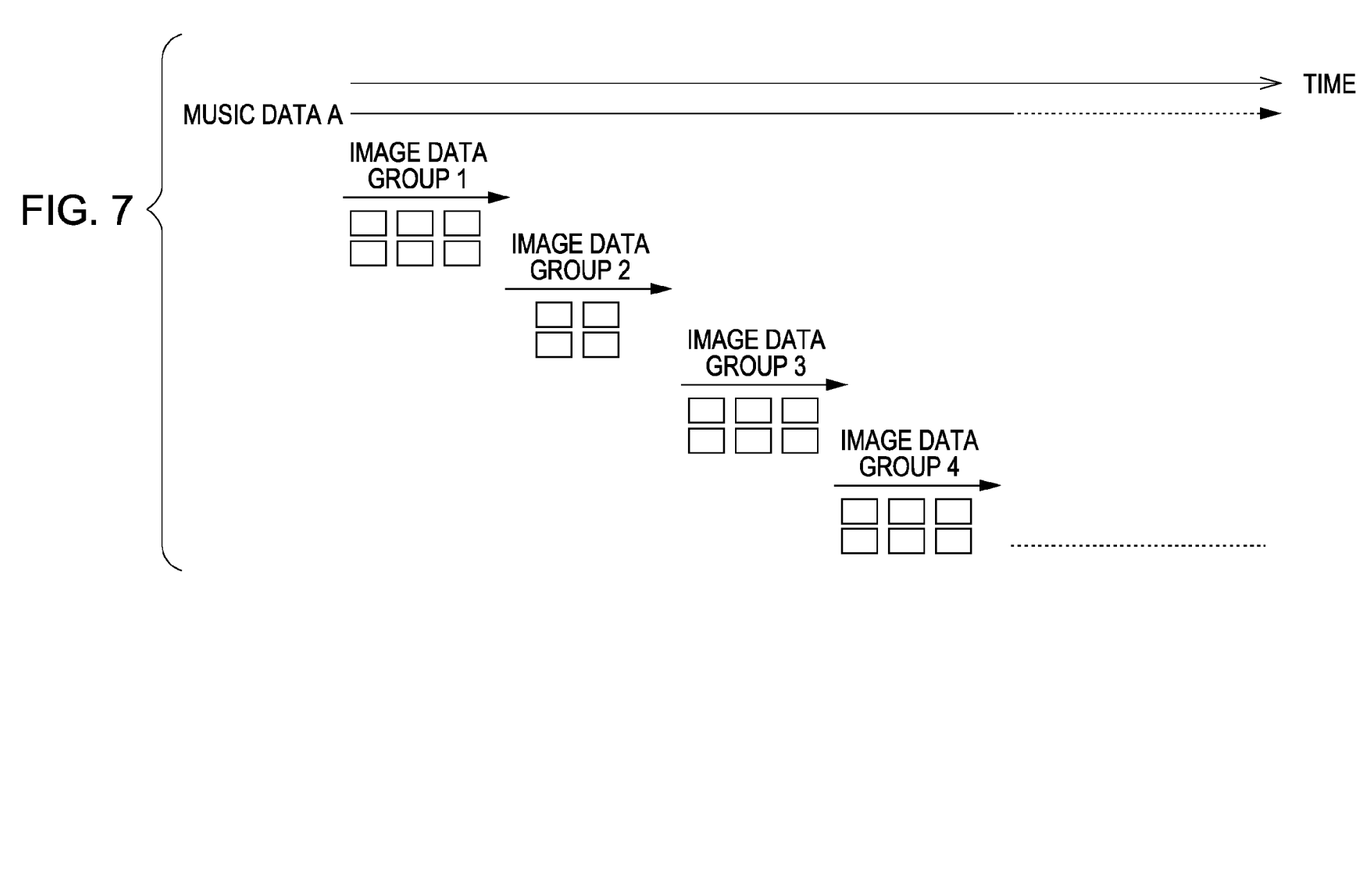
FIG. 7 is a conceptual diagram illustrating an exemplary data organizing method in which, in the data reproducing apparatus, image data is grouped together and arranged according to music data.

When reproduced images are displayed in a manner illustrated in FIG. 5 or 6, the data organizing unit 107 organizes the corresponding image data as illustrated in FIG. 7.

Referring to FIG. 7, with respect to music data A, image data groups 1 to 4 are sequentially displayed, in this order, for predetermined time periods.

The order in which these image data groups are displayed is not specified by the user, but is determined as a result of grouping performed such that image data matches obtained music data. The grouping is performed on the basis of a comparison between the total reproduction time of music data on a list created by a music data reproduction list creating unit 106 and the display time specified for image data by the user. In other words, image data is grouped according to an organization parameter determined by the data organizing unit 107 on the basis of the amount of music data, the amount of image data, attributes of image data, and the like.

Figure 8:
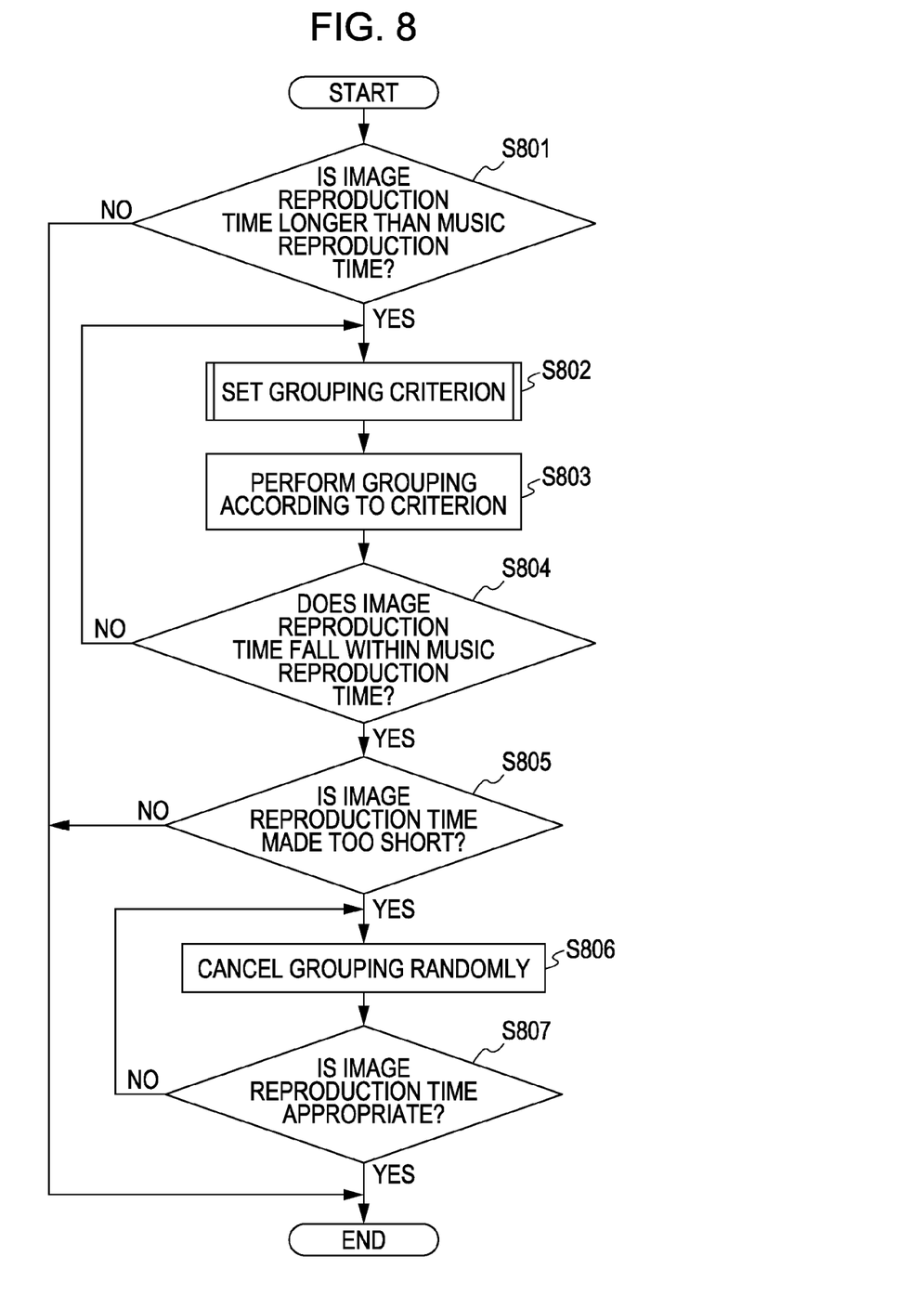
FIG. 8 is a flowchart illustrating an exemplary operation for grouping image data in the data reproducing apparatus.

FIG. 8 is a flowchart illustrating an exemplary operation performed in the data reproducing apparatus 101 of the present exemplary embodiment for grouping image data according to an organization parameter set in the data organizing unit 107.

First, in step S801, it is checked whether the reproduction time of image data (or image reproduction time) is longer than the reproduction time of music data (or music reproduction time). If the image reproduction time is not longer than the music reproduction time (NO in step S801), the process ends. If the image reproduction time is longer than the music reproduction time (YES in step S801), an appropriate grouping criterion is set in step S802.

For example, a grouping criterion is set such that image data items having creation time attributes that are within a one-minute range are grouped together into a single group. It is also possible that image data items to which the user has assigned the same category attribute are grouped together. The grouping criterion can be arbitrarily set by the user.

The process proceeds to step S803, where image data items are divided into groups according to the grouping criterion set in step S802.

The process proceeds to step S804, where it is checked whether the image reproduction time is reduced to fall within the music reproduction time as a result of the grouping performed in step S803. If the image reproduction time does not fall within the music reproduction time (NO in step S804), the process returns to step S802, where the set grouping criterion is modified. Specifically, to allow the image reproduction time to fall within the music reproduction time, the set grouping criterion is modified so that image data items are divided into a smaller number of groups, each group containing a larger number of image data items.

If the image reproduction time falls within the music reproduction time (YES in step S804), the process proceeds to step S805, where it is checked whether the image reproduction time is made too short by the grouping.

If it is determined that the image reproduction time is not made too short (NO in step S805), processing ends. If it is determined that the image reproduction time is made too short (YES in step S805), the process proceeds to step S806, where the grouping is partially cancelled.

Next, in step S807, it is checked whether an appropriate image reproduction time is achieved. Steps S806 and S807 are repeated until an appropriate image reproduction time is achieved.

The process ends if it is determined that an appropriate image reproduction time is achieved (YES in step S807). The process also ends if NO in step S801 or S805.

According to the second exemplary embodiment described above, even if the amount of image data selected by the user is not balanced with that of music data obtained in accordance with the image data, reproduction data can be organized appropriately. It is thus possible to provide a data reproducing apparatus that enables the user, without much trouble, to enjoy a slideshow in which images are grouped appropriately.

Third Exemplary Embodiment

A third exemplary embodiment of the present invention will now be described in detail with reference to drawings. A configuration of a data reproducing apparatus 101 of the third exemplary embodiment is similar to that of the first exemplary embodiment and thus will not be described here.

Figure 10:
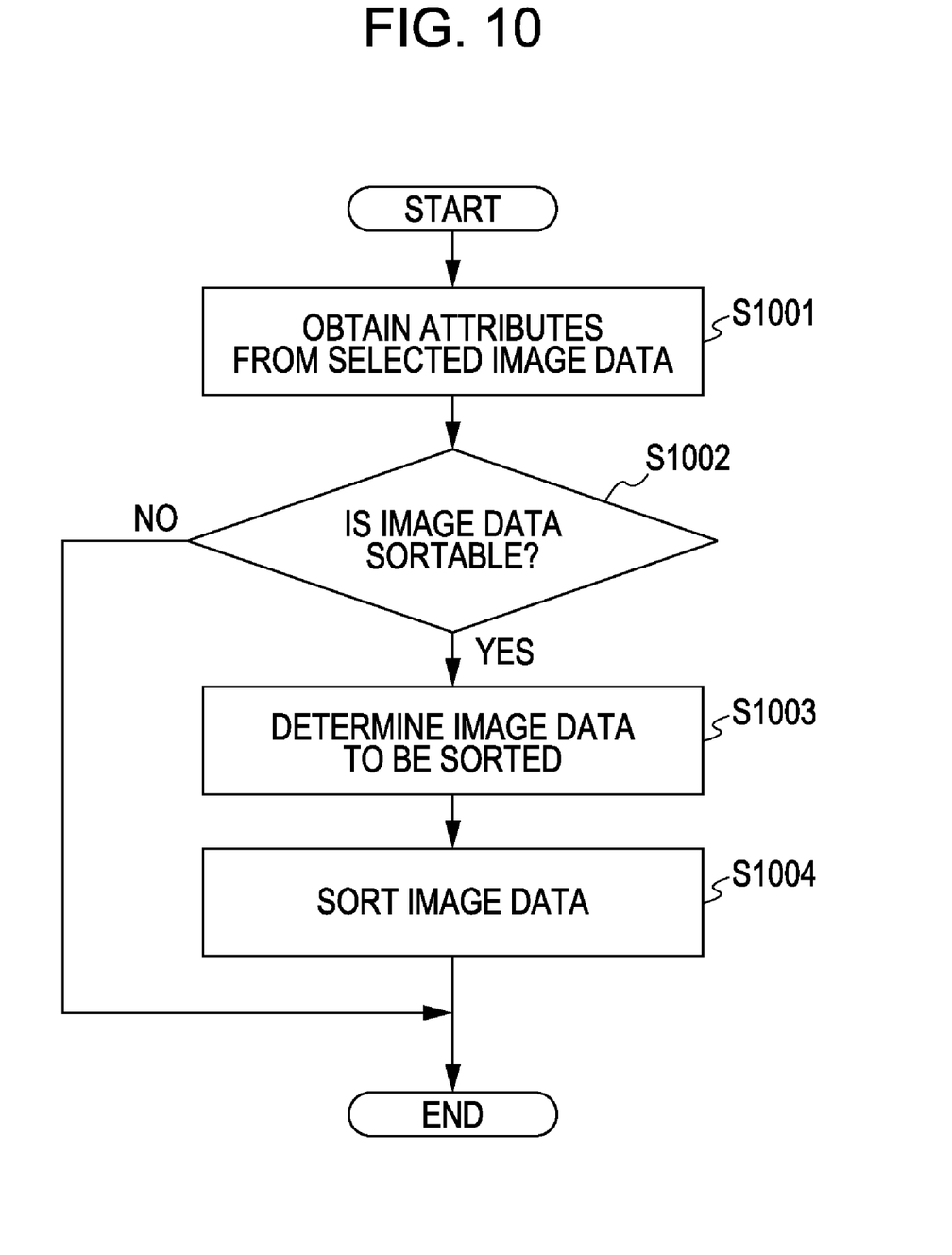
FIG. 10 is a flowchart illustrating an exemplary operation for sorting image data in a data reproducing apparatus.

FIG. 10 is a flowchart illustrating an exemplary operation performed in the data reproducing apparatus 101 of the present exemplary embodiment for sorting image data according to an organization parameter set in a data organizing unit 107.

First, in step S1001, attributes are obtained from image data selected by the user. Next, in step S1002, it is checked whether the image data is sortable.

More specifically, in step S1002, it is checked whether there is image data having attribute values for the attributes obtained in step S1001. At the same time, it is checked whether it is possible to sort the image data by the attribute values. If it is determined that the image data is not sortable (NO in step S1002), the process ends. If it is determined that the image data is sortable (YES in step S1002), the process proceeds to step S1003.

In step S1003, for example, the sortable image data is presented to the user, who selects image data to be sorted. Image data to be sorted is thus determined.

In step S1004, the selected image data is sorted. Then, the process ends. For example, if music is selected by using a creation time attribute and user attribute of image data, the selected image data can be sorted by creation time and user attribute.

For reproducing music obtained by using a creation time attribute, image data sorted by creation time is simultaneously reproduced. For reproducing music obtained by using a user attribute, image data sorted by user attribute is simultaneously reproduced.

Figure 11:
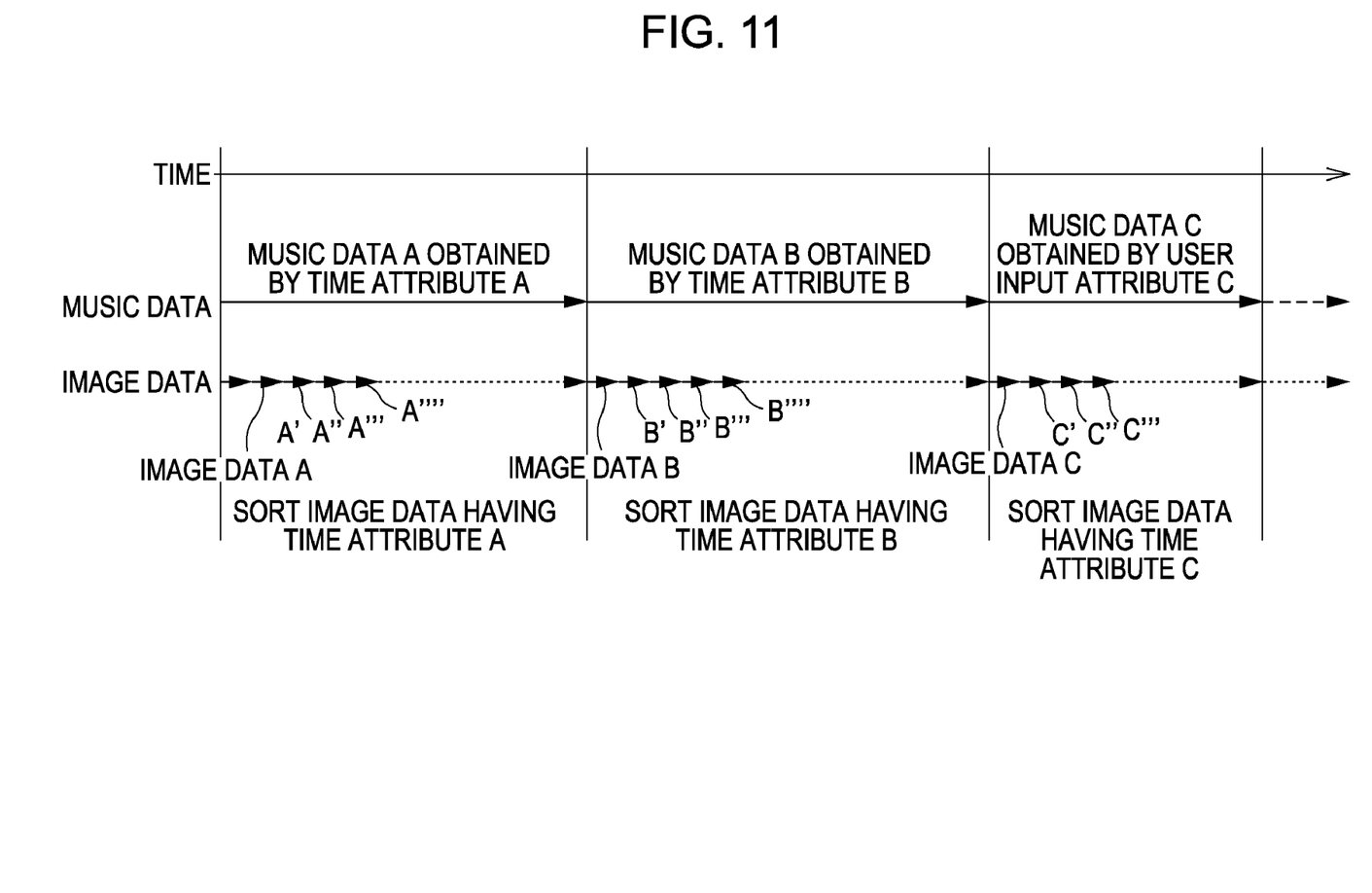
FIG. 11 is a conceptual diagram illustrating an exemplary data organizing method in which, in the data reproducing apparatus, image data is sorted and arranged according to music data.

FIG. 11 is a conceptual diagram illustrating an exemplary data organizing method in which, in the data reproducing apparatus 101 of the third exemplary embodiment, image data is sorted and arranged according to music data on the basis of an organization parameter set in the data organizing unit 107.

A description will now be made about a case in which, when attributes of images selected by the user are "time attribute A", "time attribute B", and "user input attribute C", music data is obtained with respect to each of these attributes.

Here, a music data reproduction list creating unit 106 creates lists of "music data A obtained by time attribute A", "music data B obtained by time attribute B", and "music data C obtained by user input attribute C". Therefore, if image sorting is specified by the user or by default, images are sorted in an appropriate order specified by the user.

During reproduction of music data A, image data items having "time attribute A" are reproduced in the order of "image data A", "image data A'", "image data A''", "image data A'''", and "image data A''''". More specifically, image data items having "time attribute A", such as "2005" (year), as an attribute are selected from those selected by the user and sorted by date. Image data items having the same date attribute may be sorted by time or file name.

Also, image data items having "time attribute B", such as "12/2004" (month/year), as an attribute are selected and sorted by date and time. Additionally, image data items having "user input attribute C", such as "Christmas", as an attribute are selected and sorted by year, date, and time.

Image data having a plurality of attributes is grouped by attribute with higher priority. For example, if there is an image of "Christmas" photographed in "12/2004", the image is classified into either "Christmas" or "12/2004" according to predetermined priority.

Thus, during reproduction of images photographed and saved in "2005", music that was composed, created, purchased, released, and the like in "2005" is reproduced as BGM.

Similarly, during reproduction of images photographed and saved in "12/2004", music that was composed, created, purchased, released, and the like in "12/2004" is reproduced as BGM.

If the amount of image data for a particular attribute is too large, a plurality of images may be reproduced at the same time as in FIG. 5 or 6, or music data corresponding to the image data may be reproduced over and over again. On the other hand, if the amount of image data for a particular attribute is too small, music data corresponding to the image data may be partially reproduced, or images having failed to obtain relevant music may be reproduced.

According to the third exemplary embodiment described above, even if image data selected by the user is presented in a random order, the image data can be appropriately sorted according to music data obtained in accordance with the image data. It is thus possible to provide a data reproducing apparatus that enables the user, without much trouble, to enjoy a slideshow in which images are appropriately sorted.

Fourth Exemplary Embodiment

A fourth exemplary embodiment of the present invention will now be described in detail with reference to drawings. A configuration of a data reproducing apparatus 101 of the fourth exemplary embodiment is similar to that of the first exemplary embodiment and thus will not be described here.

Figure 9:
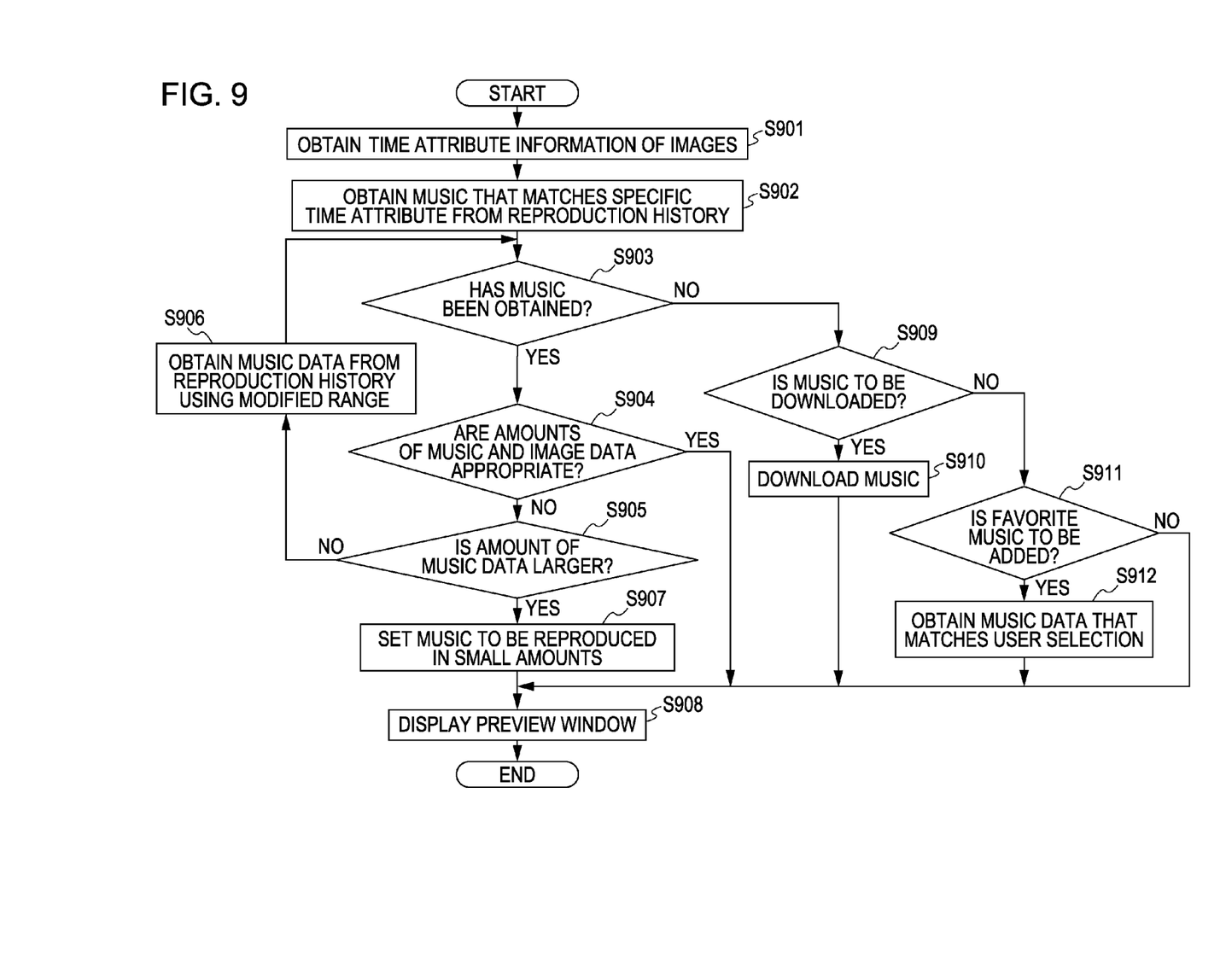
FIG. 9 is a flowchart illustrating an exemplary operation performed in the data reproducing apparatus for obtaining music data from a reproduction history.

FIG. 9 is a flowchart illustrating an exemplary operation performed in the data reproducing apparatus 101 of the present exemplary embodiment for obtaining, from a reproduction history stored in a reproduction history storage unit 105, and setting music data to be reproduced simultaneously with image data.

A program that executes this processing is stored in a program memory 103 of an information processor 108 and executed under the control of a CPU 102. This setting of music data is performed, for example, when a plurality of images are selected or when a reproduction list of a plurality of images is created.

First, in step S901, time attributes of images selected by the user are obtained.

Next, in step S902, music data reproduced many times during a month corresponding to a specific time attribute obtained in step S901 is obtained from a reproduction history stored in the reproduction history storage unit 105.

Figure 3:
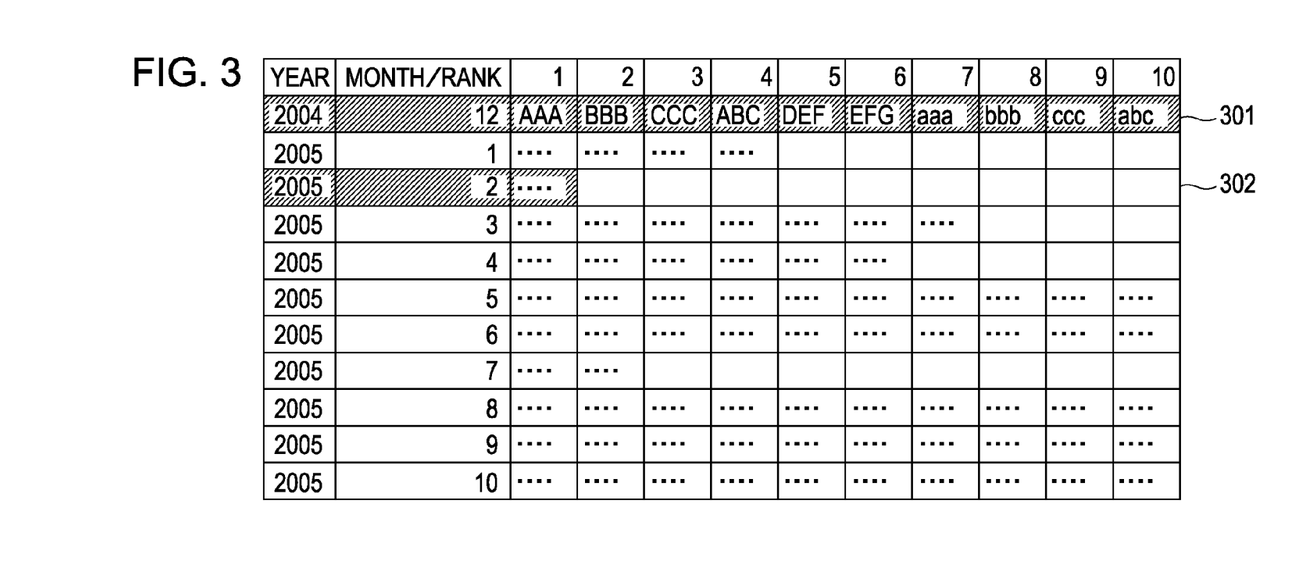
FIG. 3 shows an exemplary reproduction history stored in a reproduction history storage unit of a data reproducing apparatus.

FIG. 3 shows an exemplary reproduction history stored in the reproduction history storage unit 105. For example, a monthly ranking of frequency of reproduction of music data is stored as a reproduction history. If the time attribute obtained in step S901 is "3/12/2004" (date/month/year), the ten most frequently played tunes in December 2004 are obtained as shown in a row 301 of FIG. 3.

The reproduction history storage unit 105 needs to store a reproduction history only, and does not need to hold actual data. Therefore, when actual music data is to be removed, the user can select whether to also remove the corresponding record from the reproduction history.

Music data does not necessarily need to be stored in a storage medium 114 in the data reproducing apparatus 101. That is, the storage medium 114 may be a storage medium removable from the data reproducing apparatus 101. Music data may be stored in a device connected to the data reproducing apparatus 101 via a network or may be downloaded from the network. In other words, music data may be stored in any place and in any format as long as it can be reproduced by a reproduction controller 109.

Next, in step S903, it is checked whether music has been successfully obtained. If music has been obtained (YES in step S903), the process proceeds to step S904. In step S904, the amount of obtained music data is compared with that of selected image data so as to determine whether the amounts of the music data and image data are appropriate for simultaneous reproduction.

If the amounts of the music data and image data are appropriate (YES in step S904), the process proceeds to step S908, where a preview window is displayed. Then, the process ends. On the other hand, if it is determined that the amounts of the music data and image data are not appropriate (NO in step S904), the process proceeds to step S905, where it is determined whether the amount of the music data is larger than that of the image data. If the amount of the music data is larger than that of the image data (YES in step S905), the process proceeds to step S907, where each of a plurality of pieces of music is set to be reproduced in small amounts. The process proceeds to step S908, where a preview window is displayed. Then, the process ends. If the amount of the music data is smaller than that of the image data (NO in step S905), the process proceeds to step S906, where music is obtained from the reproduction history storage unit 105 using a modified time attribute.

For example, if the time attribute of image data is "2/2005" (month/year), there is only one piece of music data reproduced in February 2005 as shown in a row 302 of FIG. 3. Therefore, the time attribute is changed to "2005" so that an annual ranking of reproduction frequency is obtained.

It is also possible to use music data that was most frequently reproduced during three months including "2/2005" and its preceding and succeeding months. The time range may be expanded until music data is obtained. Then, to check the music data obtained in step S906, the process returns to step S903, from which the same steps as described above are performed.

The above-described reproduction history maintained by the user does not necessarily need to be used. For example, hit tunes during the period of time that matches the time attribute of image data may be used as most frequently listened-to music.

On the other hand, if it is determined that music has not been successfully obtained (NO in step S903), the process proceeds to step S909, where the user is asked whether to download music. If the user wishes to download music (YES in step S909), the process proceeds to step S910, where music that matches a time attribute of the image data is downloaded from the network or the like. The process then proceeds to step S908, where a preview window is displayed. Then, the process ends. If the user does not wish to download music (NO in step S909), the process proceeds to step S911, where the user is asked whether to set favorite music to be reproduced. If the user does not wish to set favorite music to be reproduced (NO in step S911), the process proceeds to step S908, where a preview window is displayed. Then, the process ends. If the user wishes to set favorite music to be reproduced (YES in step S911), the process proceeds to step S912, where the user's favorite music is set. The process proceeds to step S908, where a preview window is displayed. Then, the process ends.

According to the fourth exemplary embodiment described above, music data that matches a time attribute of image data selected by the user can be set using a reproduction history which records a reproduction frequency indicating how often the user has reproduced music data. It is thus possible to provide a data reproducing apparatus that enables the user to enjoy a slideshow without much trouble in setting music data for playing memorable music.

As described above, according to the embodiments of the present invention, an appropriate slideshow can be created without sorting image data in advance. Moreover, music data that matches the user's memories about image data can be automatically associated with the image data. Music data that reminds the user of the time when the image data was created or music data suitable for the content of the image data can also be associated with the image data. Additionally, even if the reproduction time of image data does not match that of music data, it is possible to make an adjustment to match them.

Therefore, it is possible to provide a method for associating effective music data with image data and a method for effectively presenting image data that is selected appropriately.

The exemplary embodiments of the present invention can be realized, for example, when a computer executes a program. A medium for supplying such a program to the computer, for example, a computer-readable recording medium (e.g., a compact disk read only memory (CD-ROM)) in which such a program is recorded or a transmission medium (e.g., the Internet) through which such a program is transmitted can also be used in the embodiments of the present invention. The program can also be used in the embodiments of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-182012 filed Jun. 30, 2006, which is hereby incorporated by reference herein in its entirety.

What is claimed is:

1. A data reproducing apparatus for reproducing data recorded in a recording medium, the data reproducing apparatus comprising:
    an organization parameter determining unit configured to determine an organization parameter for matching a reproduction list of music data and a reproduction list of image data;
    a data organizing unit configured to organize the music data and image data according to the organization parameter determined by the organization parameter determining unit, wherein the data organizing unit comprises a data grouping unit configured to group the image data according to the organization parameter and a grouping granularity determining unit configured to determine the granularity of grouping such that a reproduction time of the image data matches a reproduction time of the music data; and
    a reproducing unit configured to simultaneously reproduce the music data and image data organized by the data organizing unit.

2. A data reproducing apparatus for reproducing data recorded in a recording medium, the data reproducing apparatus comprising:
    an organization parameter determining unit configured to determine an organization parameter for matching a reproduction list of music data and a reproduction list of image data;
    a data organizing unit configured to organize the music data and image data according to the organization parameter determined by the organization parameter determining unit, wherein the data organizing unit comprises a data sorting unit configured to sort the image data according to the organization parameter, and the data sorting unit comprises a sorting target determining unit configured to determine data to be sorted such that the image data matches the reproduction list of the music data; and
    a reproducing unit configured to simultaneously reproduce the music data and image data organized by the data organizing unit.

3. The data reproducing apparatus according to claim 1, further comprising:
    a music data reproduction list creating unit configured to create a reproduction list of music data that matches an attribute of image data selected by a user; and
    a reproduction history storage unit configured to store a reproduction history which records information about reproduced music data,
    wherein the music data reproduction list creating unit uses the reproduction history stored in the reproduction history storage unit to create the reproduction list.

4. The data reproducing apparatus according to claim 3, wherein the music data reproduction list creating unit comprises a range determining unit configured to determine a range of music data to be used, the music data being stored in the reproduction history storage unit, such that the reproduction time of the image data matches the reproduction time of the music data.

5. A data reproducing method for reproducing data recorded in a recording medium, the method comprising:
    determining an organization parameter for matching a reproduction list of music data and a reproduction list of image data;
    organizing the music data and image data according to the determined organization parameter, wherein organizing the music data and image data comprises grouping the image data according to the organization parameter, and wherein grouping the image data comprises determining the granularity of grouping such that a reproduction time of the image data matches a reproduction time of the music data; and
    simultaneously reproducing the organized music data and image data.

6. A data reproducing method for reproducing data recorded in a recording medium, the method comprising:
    determining an organization parameter for matching a reproduction list of music data and a reproduction list of image data;
    organizing the music data and image data according to the determined organization parameter, wherein organizing the music data and image data comprises sorting the image data according to the organization parameter, and wherein sorting the image data comprises determining data to be sorted such that the image data matches the reproduction list of the music data; and
    simultaneously reproducing the organized music data and image data.

7. The data reproducing method according to claim 5, further comprising:
    creating a reproduction list of music data that matches an attribute of image data selected by a user; and
    storing a reproduction history which records information about reproduced music data,
    wherein creating a reproduction list of music data uses the reproduction history to create the reproduction list.

8. The data reproducing method according to claim 7, wherein creating a reproduction list of music data comprises determining a range of music data to be used, the music data being stored, such that the reproduction time of the image data matches the reproduction time of the music data.

9. A computer-readable storage medium having a computer program stored thereon for causing a computer to execute the data reproducing method according to claim 5.

10. A computer-readable storage medium having a computer program stored thereon for causing a computer to execute the data reproducing method according to claim 6.

* * * * *